United States Patent
Falk et al.

(10) Patent No.: US 9,260,030 B2
(45) Date of Patent: Feb. 16, 2016

(54) DEVICE AND METHOD FOR STORING ELECTRICAL ENERGY

(75) Inventors: Rainer Falk, Poing (DE); Steffen Fries, Baldham (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 597 days.

(21) Appl. No.: 13/642,342

(22) PCT Filed: Apr. 19, 2010

(86) PCT No.: PCT/EP2010/002388
§ 371 (c)(1),
(2), (4) Date: Oct. 19, 2012

(87) PCT Pub. No.: WO2011/131209
PCT Pub. Date: Oct. 27, 2011

(65) Prior Publication Data
US 2013/0033230 A1    Feb. 7, 2013

(51) Int. Cl.
*H02J 7/00* (2006.01)
*B60L 11/18* (2006.01)
*H02J 3/32* (2006.01)

(52) U.S. Cl.
CPC ......... *B60L 11/1842* (2013.01); *B60L 11/1864* (2013.01); *B60L 2200/22* (2013.01); *B60L 2200/26* (2013.01); *H02J 3/32* (2013.01); *Y02E 60/721* (2013.01); *Y02T 10/7005* (2013.01); *Y02T 10/7061* (2013.01); *Y02T 90/121* (2013.01); *Y02T 90/128* (2013.01); *Y02T 90/14* (2013.01); *Y02T 90/163* (2013.01); *Y04S 10/126* (2013.01)

(58) Field of Classification Search
USPC .................................................. 320/104, 135
See application file for complete search history.

(56) References Cited

U.S. PATENT DOCUMENTS

| | | | |
|---|---|---|---|
| 6,522,031 | B2 | 2/2003 | Provanzana et al. |
| 2002/0041126 | A1 | 4/2002 | Provanzana et al. |
| 2004/0026140 | A1 | 2/2004 | Suzuki et al. |
| 2004/0201365 | A1 | 10/2004 | Dasgupta et al. |
| 2006/0220601 | A1 | 10/2006 | Horii |
| 2011/0047052 | A1* | 2/2011 | Cornish ....................... 320/128 |

FOREIGN PATENT DOCUMENTS

| | | |
|---|---|---|
| CN | 1650505 A | 8/2005 |
| CN | 1864329 A | 11/2006 |
| WO | 2005/009779 | 2/2005 |
| WO | WO 2009/080993 A2 | 7/2009 |
| WO | PCT/EP2010/002388 | 4/2010 |

OTHER PUBLICATIONS

Pictures of the Future, "From Wind to Wheels," Fall 2009, pp. 44-46.
International Search Report for PCT/EP2010/002388, mailed on Jan. 19, 2011.
First Office Action issued May 23, 2014 for corresponding Chinese Patent Application No. 201080066331.5.

\* cited by examiner

*Primary Examiner* — Robert Grant
(74) *Attorney, Agent, or Firm* — Staas & Halsey LLP

(57) ABSTRACT

A device for storing electrical energy in a vehicle includes at least one vehicle battery, which can be connected to an electrical power network by a vehicle charging interface of the vehicle. The vehicle battery has a storage capacity for storing electrical energy. The storage capacity of the vehicle battery is partitioned for different users.

13 Claims, 1 Drawing Sheet

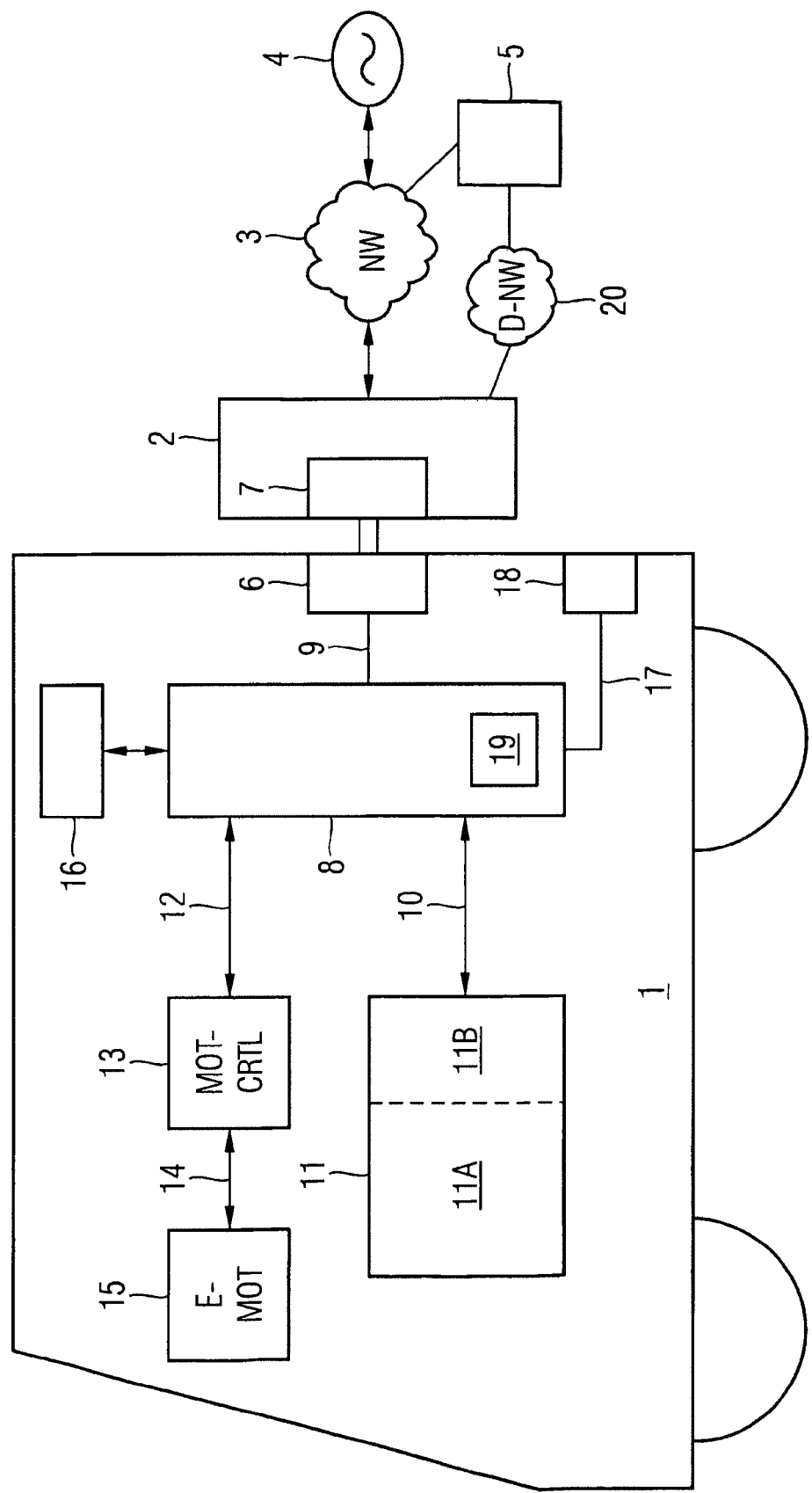

DEVICE AND METHOD FOR STORING ELECTRICAL ENERGY

CROSS REFERENCE TO RELATED APPLICATIONS

This application is based on and hereby claims priority to International Application No. PCT/EP2010/002388 filed on Apr. 19, 2010, the contents of which are hereby incorporated by reference.

BACKGROUND

The invention relates to a device and a method for storing electrical energy in vehicle batteries in vehicles.

Vehicles are increasingly being driven by electric motors. To achieve this, an electrical charge or electrical energy is charged in a vehicle battery, which supplies consumer units with current, in particular an electric motor of the vehicle, when the vehicle is in travel operation mode. Increasingly, also, energy or current is being fed into the public mains network which derives from wind power systems. The power available in the mains network is therefore subject to fluctuations which are dependent on the amount of the wind current being fed in. In order to reduce such fluctuations it is necessary for these current fluctuations to be buffered in separate current storage units, which are connected to the network, and for superfluous current to be stored intermediately.

It was therefore proposed to use vehicles as mobile current storage units, as reported in Pictures of the Future, Autumn 2009, pages 44-46, "Electric automobile in the Smart Grid" (http://w1.siemens.com/innovation/de/publikationen/pof-herbst200/energie/ecar.htm), wherein consideration is given to vehicles being electrically refueled in a public mains network in order to take up windpower current. If in this situation the demand for current is high, current will be fed back from the vehicles into the network. The vehicles accordingly serve to compensate for fluctuations which are caused, for example, by windpower current. The vehicle batteries in the vehicles make their storage capacity available to the mains network, in order to buffer current or power fluctuations respectively.

A disadvantage with these conventional storage devices is, however, that the vehicle keeper does not have complete control of the load charge state of the vehicle battery contained in his vehicle. If, for example, the vehicle battery of the keeper's electric vehicle connected to the mains network is discharged due to a high demand for current in the mains, then the electrical charge remaining in the electric vehicle's battery may no longer be sufficient, under certain circumstances, for the purposes of the vehicle keeper. For example, if the vehicle keeper or driver wishes to drive away from the electricity tapping column, by which the electric vehicle is connected to the mains network, in order to reach a destination, it may occur that, due to the discharge of the vehicle battery, incurred by the high demand for current in the mains network, the remaining electrical energy or charge stored in the electric battery will no longer be sufficient to reach the destination. In this case the driver would be compelled to charge up the vehicle battery before starting the journey, which would require a certain and not inconsiderable charging time. In this case the driver would therefore be compelled to wait until the vehicle battery had reached the required charge state before being able to depart for the destination.

SUMMARY

It is therefore one possible object to provide a device and method for the storage of electrical energy in a vehicle, which on the one hand allows for surplus energy from the mains network to be stored intermediately in the storage device and, on the other, allows the driver to have complete control over the vehicle battery of the vehicle.

The inventors propose a device for the storage of electrical energy in a vehicle with a vehicle battery, which can be connected by way of a charging interface of the vehicle to a mains network, and which has a storage capacity for the storage of electrical energy, wherein the storage capacity of the vehicle battery is partitioned for different users.

In one embodiment of the device, an energy management module is provided between the vehicle battery and the charging interface of the vehicle, which partitions the storage capacity of the vehicle battery into different user storage capacities.

In one embodiment of the device, the storage capacity of the vehicle battery is partitioned by the energy management module logically into different user storage capacities.

In one possible embodiment of the device, the energy management module addresses different energy storage cells of the vehicle battery.

In one embodiment of the device, each user storage capacity of the vehicle battery can be charged and discharged by the energy management module independently of other user storage capacities of the vehicle battery via the charging interface.

In one embodiment of the device, the user storage capacities exhibit at least one first storage capacity for the storage of electrical energy for the vehicle and a second storage capacity for the intermediate storage of energy for a current supplier.

In one embodiment of the device, the energy management module allocates the user storage capacities to different users, wherein the users consume different consumer units of the vehicle which require electrical energy, different persons who drive the vehicle, and different power providers which intermediately store electrical energy in the vehicle battery of the vehicle.

In one embodiment of the device, each partitioned user storage capacity of the vehicle battery comprises
an adjustable virtual storage capacity,
a partitioned identity, and
a charge state.

In one embodiment of the device, the energy management module monitors the particular charge state of the user storage capacities of the vehicle battery.

In one embodiment of the device, the charging interface of the vehicle can be connected to an electricity tapping column of the mains network for the charging and discharging of the partitioned user storage capacities of the vehicle battery.

In one possible embodiment of the device, the energy management module of the vehicle authenticates itself to the electricity tapping column of the mains network.

In one embodiment of the device, the vehicle comprises at least one electric motor, the engine management system of which, by way of the energy management module, in a travel mode of the vehicle, draws electrical energy from a partitioned storage capacity of the vehicle battery pertaining to it, which is provided for the supply of the electric motor.

In one embodiment of the device, during a braking procedure of the vehicle, electrical energy is fed back by the electric motor into the partitioned storage capacity of the vehicle battery pertaining to it, which is provided for the supply of the electric motor.

The inventors further propose an energy storage system with a plurality of storage devices for the storage of electrical energy in a vehicle, wherein each storage device comprises at least one vehicle battery, which can be connected via a charging interface of the vehicle to a mains network, and a storage capacity for the storage of electrical energy, wherein the storage capacity of the vehicle battery is partitioned for different users, wherein the mains network is supplied with electrical energy by at least one current provider, and the electrical energy present in the mains network can be intermediately stored by the current provider in partitioned storage capacities of the vehicle batteries.

The inventors further propose a method for the storage of electrical energy, which is provided in a mains network by at least one current provider, wherein the electrical energy provided is at least partially stored intermediately in partitioned storage capacities, provided for that purpose, by vehicle batteries which can be connected to the mains network.

BRIEF DESCRIPTION OF THE DRAWINGS

These and other objects and advantages of the present invention will become more apparent and more readily appreciated from the following description of the preferred embodiments, taken in conjunction with the accompanying drawings of which:

As can be seen from the FIGURE, a vehicle 1 can be connected to a electricity tapping column 2 of a mains network 3. The vehicle 1 represented is a motor vehicle, namely an automobile.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

Alternatively, the vehicle 1 can be other types of vehicle, in particular electrically driven trains or electric wagons, such as are used on golf courses, for example. The mains network 3 is, for example, a public mains network of a current provider, into which current or electrical energy is fed via one or more power generators 4. The current supplier concerned has, for example, its own server 5, which communicates via the mains network 3 or a separate data network with the electricity tapping column 2. The mains network 3 can exhibit a plurality of electricity tapping columns 2 connected to it. Moreover, a plurality of different power generators 4 can be connected to the mains network 3, such as windpower systems. The mains network 3 is, for example, a mains network which provides an alternating current voltage or an alternating current for the consuming component. The vehicle 1 comprises a vehicle charging interface 6, which can be connected to a corresponding charging interface 7 of the electricity tapping column 2. A charging interface 6 can, for example, be a plug, which can be inserted into a corresponding socket 7. Alternatively, the charging energy, during the charging of the vehicle 1 and/or when feeding back into the mains network 1, can be transferred inductively between the vehicle charging interface 6 and the charging interface 7 of the electricity tapping column 2. The charging interface 6 of the electric vehicle 1, as represented in the FIGURE, is connected to an energy management module 8 contained in the vehicle 1. The energy management module 8 is connected by a lead 9 to the charging interface 6 of the vehicle. In addition to this, the energy management module 8 is also connected via a lead 10 to a vehicle battery 11 of the vehicle. The vehicle battery 11 of the vehicle exhibits a specific storage capacity for the storage of electrical energy or the storage of an electrical charge respectively. With the storage device, the storage capacity of the vehicle battery 11 is partitioned for different users. With the example represented in the FIGURE, the storage capacity of the vehicle battery 11 is partitioned to a first storage capacity 11A and a second storage capacity 11B. The energy management module 8 of the vehicle 1 is connected via a lead 12 to an engine management system 13, which in turn actuates, via leads 14, an electric motor 15 contained in the vehicle 1. With one possible embodiment, the energy management module 8 can be configured by a user by a configuration interface 16. The user can be, for example, the driver of the vehicle 1. With one possible embodiment, the partitioning of the vehicle battery 11 into different storage capacities is carried out logically by the energy management module 8. For example, the separation and partitioning respectively can be carried out on the logic level, in that several virtual user storage capacities can be provided on the logic level to the charging unit or the electricity tapping unit 2 respectively by the energy management module 8. In this way the vehicle battery 11 has an electrical interface, by which it can be physically charged and discharged, wherein the vehicle battery 11, however, represents several separate batteries or storage capacities respectively, in respect of its energy management, i.e. in respect of its charge state, its storage capacity, its identity, and, for example, in respect of the individual power billing. This logical division of the vehicle battery 11 can, in one embodiment, be realized completely via the vehicle's energy management module 8. In this situation, storage capacities are defined as virtual batteries or user storage capacities respectively, which are offered to the outside to units independently of one another for the storage of electric power. These outside units are both power consumer units as well as power providers or power generation units.

With one possible embodiment, energy storage cells of the vehicle battery 1 can be addressed individually and collectively. This makes it possible for any desired array or field of battery cells to be combined with several virtual storage batteries to form one vehicle battery 11 allocated directly to the vehicle keeper. An advantage in this situation is that, in the event of the failure of individual energy storage cells of the vehicle battery 11, the user storage capacity of the vehicle battery 11 allocated to the vehicle keeper can be kept constant by reconfiguration or remapping of the cell arrangement.

With the exemplary embodiment represented in the FIGURE, the vehicle battery 11 is partitioned into two separate user storage capacities IIA, IIB. In other embodiments, the vehicle battery 11 can be partitioned into a considerable number of user storage capacities. In the energy management module 8 an allocation or mapping table can be stored, which allocates the physical storage areas of different user storage capacities, wherein, in turn, different consumer units or power providers are allocated to these. Each user storage capacity 11-$i$ of the vehicle battery 11 is in this situation capable of being charged and discharged independently of other user storage capacities of the same vehicle battery 11 via the charging interface 6, 7. In one variant, a first user storage capacity 11-$i$ can be both charged and also discharged via the charging interface 6, 7, while by contrast a second user storage capacity 11-$i$ can only be charged via the charging interface 6, 7, but is not dischargeable. With the example represented in the FIGURE, the vehicle battery 11 exhibits two user storage capacities 11A, 11B. In this situation, the first storage capacity 11A can be provided for the storage of electrical energy for the vehicle 1, and the second storage capacity 11B for the intermediate storage of energy for a power provider. For example, the user storage capacity 11A can be provided for the power supply of the electric motor 15 inside the vehicle 1 during travel operation of the vehicle 1. The second storage capacity 11B is provided, for example, for the intermediate storage of energy for a power provider of the mains network 3.

With one possible embodiment, the different partitioned user storage capacities 11A, 11B of the vehicle battery 11 exhibit configurable and adjustable storage capacities. For example, 80% of the physical storage capacity C of the vehicle battery 11 can be allocated to the first user storage capacity 11A and 20% of the physical storage capacity of the vehicle battery 11 can be allocated to the second user storage capacity 11B. The attribution or allocation of physical storage capacity C to different user storage capacities of different users can be effected, for example, via the user interface 16. With one possible embodiment, this configuration is carried out by a technician in a vehicle garage or at the vehicle manufacturer. With one possible embodiment, the different partitioned user storage capacities exhibit in each case the same storage capacity $C_{part}$ for the storage of electrical energy. Alternatively, the storage capacities of the partitioned user storage capacities may deviate individually from one another.

The user storage capacities 11A, 11B can be allocated to different types of users. With one possible embodiment, the user storage capacities 11-$i$ are allocated to different consumer units within the vehicle 1, which consume current or electrical energy respectively, such as the electric motor 15 or also other consumer units, such as a seat heating system, a rear window heating system, or a car radio. With a further possible embodiment, the user storage capacities 11-$i$ can be allocated to different persons who drive the vehicle 1. For example, a first user storage capacity can be allocated to the vehicle keeper of the vehicle 1, while other user storage capacities can be allocated to other family members, such as the wife or adult children of the vehicle keeper for instance. Moreover, the different users can be different employee drivers of a transport company. Moreover, some of the user storage capacities of the vehicle battery 11 can be assigned to different power providers who feed electrical energy into the mains network 3. The physically present storage capacity of the vehicle battery 11 can therefore be divided or partitioned over several users. The partitioning or division of the physical storage capacity of the vehicle battery 11 can be specified as fixed, but changeable in an operational mode of the vehicle 1. With one possible embodiment, it is possible for a displacement of battery capacities to take place during the travel operation. The different virtual battery capacities or user storage capacities of the vehicle battery 11 are for preference managed separately by the energy management module 8, in particular in respect of their individual charge state. This means that the different user storage capacities can be charged and discharged separately by the energy management module 8.

With one possible embodiment, use of power and the power billing associated with this takes place regardless of in which virtual battery or in which user storage capacity 11-$i$ the electrical energy or power which is used in each case is stored, how much of the stored electrical energy is used or consumed, how much of the stored electrical energy is lost due to parasitic discharge processes, and how much of the energy charged in the user storage capacity is fed back into the mains network.

Each partitioned user storage capacity 11-$i$ of the vehicle battery 11 comprises for preference an adjustable virtual storage capacity $C_{part}$, a partitioning identity PART-ID, and a corresponding charge state L. With one preferred embodiment, the energy management module 8 monitors the individual charge state L of a user storage capacity 11A, 11B of the vehicle battery 11. For example, the energy management module 8 can recognize that the user storage capacity 11A is fully charged, while the other user storage capacity 11B of the vehicle battery is only 10% charged. To monitor the charge state L of the user storage capacities, the energy management module 8 comprises for preference a current measuring device, which acquires the current charged into the different storage capacities or the charge charged therein respectively. With one possible embodiment, the energy management module 8 can carry out a virtual transfer from a first user storage capacity 11$i$ to a second user storage capacity 11$i$ inside the same vehicle battery 11.

With the embodiment represented in the FIGURE, the vehicle 1 is in a parked state, and is connected via the charging interface 6, 7 to the electricity tapping column 2 of the mains network 3. In this parked state, different partitioned user storage capacities 11A, 11$b$ of the vehicle battery 11 can be charged in accordance with the configuration. It is further possible for a power provider 3 to carry out intermediate storage of surplus energy or surplus current respectively, such as wind power, in one or more partitioned storage capacities of the vehicle battery 11. During the parked state of the vehicle 1, the energy stored intermediately by the energy provider can once again be drawn off by the power provider, by the discharging of the corresponding partitioned user storage capacity, from the vehicle battery 11.

When the vehicle 1 drives off, the driver of the vehicle 1 disconnects the charging interface 6 of the vehicle 1 from the electricity tapping column 2 and sets the electric motor 15 in motion. The engine management system 13 provides the electric motor 15 with current during travel operation, which is drawn from a partitioned storage capacity of the vehicle battery 11 pertaining to it. With one possible embodiment, during a braking procedure of the vehicle 1, energy is fed back into the vehicle battery 11 by the engine management system 13.

With the device it is possible for electrical energy to be intermediately parked or intermediately stored in the vehicle battery 11, wherein this intermediately stored electrical energy does not belong to the vehicle 1 or its keeper. This means that the intermediately stored energy cannot yet be used by the vehicle user or the vehicle. With one possible embodiment, if the need arises, a virtual transfer of the intermediately stored energy takes place into another user storage capacity of the vehicle battery 11, which can then be used by a consumer unit of the vehicle 1. With one possible embodiment, in addition, billing data is produced by the energy management module 8, which is made available to the power provider(s).

With one possible embodiment the energy management module 8 of the vehicle 1 is connected to a mobile radio module 18 of the vehicle 1 via a lead 17. This mobile radio module 18 can communicate via an appropriate infrastructure, for example with the server 5 of the power provider. With one possible embodiment, the mobile radio module 18 transfers billing information data from the energy management module 8 to a server 5 of the power provider or mains network operator. With an alternative embodiment, corresponding billing information data or other data, such as data regarding the charge state of the different user storage capacities, can be transferred via the charging interface 6, 7, and the mains network 3 to the server 5 of the power provider, for example by power-line communication. It is further possible for the charging interface 6, 7, to create additionally a communications data connection between the energy management module 8 and the electricity tapping column 2 when the plug 6 is inserted into the socket 7, wherein the electricity tapping column 2 can be connected via a separate data network to the server 5 of the power provider. When the plug 6 is inserted into the socket 7 of the electricity tapping column 2, billing information can be transferred from different user storage capacities 11-$i$ inside the vehicle battery 11 to the server 5 of the power provider, which evaluates the data. With one possible embodiment, it is possible, for example, for a vehicle 1 to draw current or energy for different partitioned user storage capacities 11-$i$ inside the vehicle battery 11 under different conditions from the power provider of the mains network 3. If, for example, the partitioned user storage capacity 11A is fixedly allocated to the vehicle 1, for example to the consumer unit 15, and if the second partitioned user storage capacity 11B is made available to the power providers for the intermediate storage of their energy, then the vehicle keeper of the vehicle 1 can, with one possible embodiment, draw current or energy, which is stored in the second partitioned user storage capacity 11B, more favorably than energy or current which is stored exclusively for him in the first partitioned user storage capacity 11A.

With one possible embodiment, the energy from the vehicle 1 which is intermediately stored in the partitioned user storage capacity 11B can be fed back into the same or another energy or mains network 3, for example if the vehicle 1 is parked in a carpark and connected to an electricity tapping column 2. With one possible embodiment, in the case of the current billing or settlement, the infrastructure operator or power provider who originally fed the energy into the partitioned user storage capacity concerned, such as the user storage capacity 11B, is compensated by another infrastructure operator or power provider, who now has the intermediately stored energy provided after connection to the electricity tapping column 2. With one possible embodiment, additionally, the point of time of charging and the current energy price can be used for the billing and settlement. The settlement can be effected by a clearing server.

With one possible embodiment, the energy management module 8 comprises a configuration memory 19, in which configuration data can be deposited. In the configuration data memory 19, it is possible, for example, as configuration data, for the distribution of the entire storage capacity of the vehicle battery 11 to the different virtual user storage capacities to be stored. In addition to this, control rules or control information can be stored in the configuration memory 19 during a configuration. These control rules or this control policy can indicate, for example, for the different partitioned user storage capacities of the vehicle battery 11, when these are to be charged or discharged in each case. For example, a control policy for a partitioned user storage capacity 11-1 of the vehicle battery 11 can indicate that this partitioned user storage capacity 11-1 is loaded if the present price of current from a particular power provider of the network 3 lies below an adjustable threshold value. A further possibility for a control rule which is deposited in the configuration memory 19 is that the partitioned user storage capacity 11-$i$ concerned, which is provided, for example, for the intermediate storage of charge from a power provider, is only discharged if the present price of current from the power provider lies above a specific threshold value. The information data relating to a present price of current can obtain the energy management module 8, for example, via the mobile radio module 18, or in the parked state from the electricity tapping column 2 of the mains network 3. For each partitioned user storage capacity 11-$i$, one or more control rules can be deposited in the configuration memory 19.

During the charging process of the vehicle battery 11, the energy management module 8 can determine the sequence in which the different user storage capacities 11-$i$ of the vehicle battery 11 are charged up. For example, first a main battery or a partitioned user storage capacity 11A provided for the vehicle 1 can be charged for as long as required until this partitioned user storage capacity 11A reaches a specific charge state, before one or more further virtual batteries or user storage capacities are charged up.

With one possible embodiment, an individual safety or security functionality is allocated to each partitioned user storage capacity or each virtual battery respectively. Each partitioned user storage capacity 11-$i$ is provided in this situation with its own, preferably cryptographically secured, partitioning identity, PART-ID. On the basis of this partition identity, billing information can be determined for the charging and energy drawing of this virtual battery 11-$i$. Moreover, each virtual battery and each partitioned user storage capacity 11-$i$ has a secured current output and current infeed, i.e. the energy management module 8 acquires the current output and the current infeed of the partitioned user storage capacity 11-$i$ and deposits this, cryptographically secured, in an internal memory. In this situation, for preference, a counter (metering device) is provided, which can, for example, be integrated directly into the vehicle battery 11. This counter can be provided with an integrated signature function, which signs the memory data and the data from the partitioned user storage capacities 11-$i$ respectively and, if required, uses this for billing during transfer for example.

With one possible embodiment, the energy management module 8 of the vehicle 1 authenticates itself to the electricity tapping column 2 of the network 3. As a result of this it is possible, for example, for the electricity tapping column 2 to recognize which vehicle 1 is concerned, and in particular also which type of vehicle is concerned. With one possible embodiment, the electricity tapping column 2 can read out the configuration data in respect of the partitioning of the vehicle battery 11 after the insertion of the plug 6 into the power socket 7 from the configuration memory 19 of the energy management module 8. The electricity tapping column 2 therefore receives as information the fact that the vehicle battery 11 is, for example, logically divided into two separate partitioned user storage capacities 11A, 11B. Moreover, the electricity tapping column 2 receives the information, for example, that the second partitioned user storage capacity 11B is available for the intermediate storing of energy for a specific power provider. Moreover, the electricity tapping column 2 can in this way determine how large the charge capacity is of the user storage capacity allocated to the intermediate storage. For example, the electricity tapping column recognizes, on the basis of the type of the vehicle 1 or, respectively, on the basis of the type of the vehicle battery 11, the total capacity C of the vehicle battery 11 which is available, and additionally receives as information from the configuration memory 19, that the second partitioned user storage capacity 11B, which is available for the power provider, amounts to 20% of the total capacity C. If, for example, the vehicle battery has a total capacity of 10 Ah, then the electricity tapping column 2 learns that 2 Ah is available to the power provider 2 for the intermediate storage of energy. This information about the storage space available can be transferred to the corresponding server 5 of the power provider. For example, the electricity tapping column 2 can be connected via a separate data network 20 to the corresponding server 5 of the power provider. This data network 20 can, for example, be the Internet. The IP addresses or DNS names of the different power providers are, for example, deposited in an address data memory of the electricity tapping column 2. With one possible embodiment, different partitioned user storage capacities are reserved for different power providers in the vehicle battery 11 of the vehicle 1. With the embodiment represented in the FIGURE, the electricity tapping column 2 is connected via the data network 20 to a server 5 of the power provider. With an alternative embodiment, the electricity tapping column 2 is likewise provided with a mobile radio module for the connection to a server 5 of a power provider.

With the embodiment represented in the FIGURE, the vehicle battery 11 is integrated in the vehicle 1. With an alternative embodiment, the vehicle battery 11 of the vehicle 1 can be exchanged in a simple manner. With this embodiment, the vehicle battery 11 can be charged or discharged respectively separately from the vehicle 1 by the electricity tapping column 2.

With one possible embodiment, the vehicle battery 11 is provided with an integrated energy management module 8, i.e. with this embodiment the energy management module 8 is integrated in an intelligent vehicle battery 11 of this type.

With one possible embodiment, each vehicle 1 is provided with at least two separate vehicle batteries 11, wherein, during the travel operation of the vehicle 1, one of the two vehicle batteries for the power supply is located in the vehicle 1, and the other vehicle battery is charged up at an electricity tapping column 2. The driver of the vehicle 1 can then, if required, exchange the two vehicle batteries.

With a further possible embodiment, each vehicle 1 is provided with its own electricity tapping column 2. With this embodiment, the energy management module 8 can also be located inside the electricity tapping column 2.

The inventors' proposals offer the possibility of storing electrical energy which is provided in a mains network 3 by at least one power provider, wherein the electrical energy provided can at least partially be intermediately stored in partitioned storage capacities of vehicle batteries 11 of different vehicles 1 provided for this purpose. The partitioning and the charging and discharging processes for the respectively partitioned storage capacities of the vehicle battery 11 can take place under the control of a control program, which is implemented by a calculation unit, in particular a microprocessor, of the energy management module 8. This control program can be stored or loaded respectively, for example, via a configuration interface of the energy management module 8 in a program memory of the energy management module 8.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A device to store electrical energy in a vehicle, comprising:
    a vehicle battery, which can be connected via a vehicle charging interface of the vehicle to a main power network, the vehicle battery having a storage capacity for storage of electrical energy and having a plurality of energy storage cells; and
    an energy management module to logically partition the storage capacity of the vehicle battery by individually addressing the energy storage cells of the vehicle battery, wherein
    the storage capacity of the vehicle battery is partitioned for a plurality of different users, and
    the energy management module partitions the storage capacity of the vehicle battery logically into a plurality of different user storage capacities respectively for the plurality of different users.

2. The device as claimed in claim 1, wherein the energy management module is provided between the vehicle battery and the vehicle charging interface.

3. The device as claimed in claim 1, wherein
    each of the user storage capacities of the vehicle battery can be charged or discharged via the energy management module and the vehicle charging interface, independently of other user storage capacities.

4. The device as claimed in claim 1, wherein
    the user storage capacities comprise a first storage capacity for storage of electrical energy for the vehicle and a second storage capacity for intermediate storage of energy for a power provider.

5. The device as claimed in claim 1, wherein
    the different users are selected from the group consisting of different consumption units that consume electrical energy power within the vehicle, different drivers of the vehicle, and different power providers who intermediately store electrical energy in the vehicle battery.

6. The device as claimed in claim 1, wherein
    each user storage capacity comprises:
        an adjustable virtual storage capacity;
        a partitioning identity; and
        a charge state.

7. The device as claimed in claim 6, wherein
    the energy management module monitors the charge state of each user storage capacity.

8. The device as claimed in claim 1, wherein
    the vehicle charging interface connects to an electricity tapping column of a main power network to charge and discharge the user storage capacities of the vehicle battery.

9. The device as claimed in claim 8, wherein the energy management module authenticates itself to the electricity tapping column.

10. The device as claimed in claim 1, wherein
    the vehicle comprises an electric motor and an engine management system,
    the electrical motor is assigned a motor-user storage capacity to supply electric energy to the electrical motor, and
    when the vehicle is in a travel operational mode, the engine management system draws electrical energy via the engine management module from the motor-user storage capacity.

11. The device as claimed in claim 10, wherein
    during a braking procedure of the vehicle, braking energy is absorbed by the electric motor and fed back into the motor-user storage capacity.

12. An electrical energy storage system, comprising:
    a plurality of vehicle storage devices, each comprising:
        a vehicle battery, which can be connected via a vehicle charging interface of a vehicle to a main power network, the vehicle battery having a storage capacity for storage of electrical energy and having a plurality of energy storage cells; and an energy management module to logically partition the storage capacity of the vehicle battery by individually addressing the energy storage cells of the vehicle battery, wherein for each vehicle storage device, the storage capacity of the vehicle battery is partitioned for a plurality of different users, for each vehicle storage device, the energy management module partitions the storage capacity of the vehicle battery logically into a plurality of different user storage capacities respectively for the plurality of different users, the main power network is supplied with electrical energy by a power provider, and the electrical energy present in the main power network can be stored by the power provider in at least some of the storage capacities of vehicle batteries.

13. A method to store electrical energy provided from a main power network by a power provider, comprising:

for each of a plurality of vehicles, partitioning storage capacity of a vehicle battery, the storage capacity being partitioned for a plurality of different users, each vehicle having an energy management module that logically partitions the storage capacity of the vehicle battery into a plurality of different user storage capacities respectively for the plurality of different users, the energy management module partitioning the storage capacity by individually addressing energy storage cells of the vehicle battery;

for each vehicle battery, assigning at least one of the energy storage capacities to the power provider; and intermediately storing the electrical energy provided from the main power network, in user storage capacities assigned to the power provider.

\* \* \* \* \*